Aug. 24, 1948.   J. D. GLEITZ   2,447,853
OIL PUMP
Filed Jan. 19, 1943
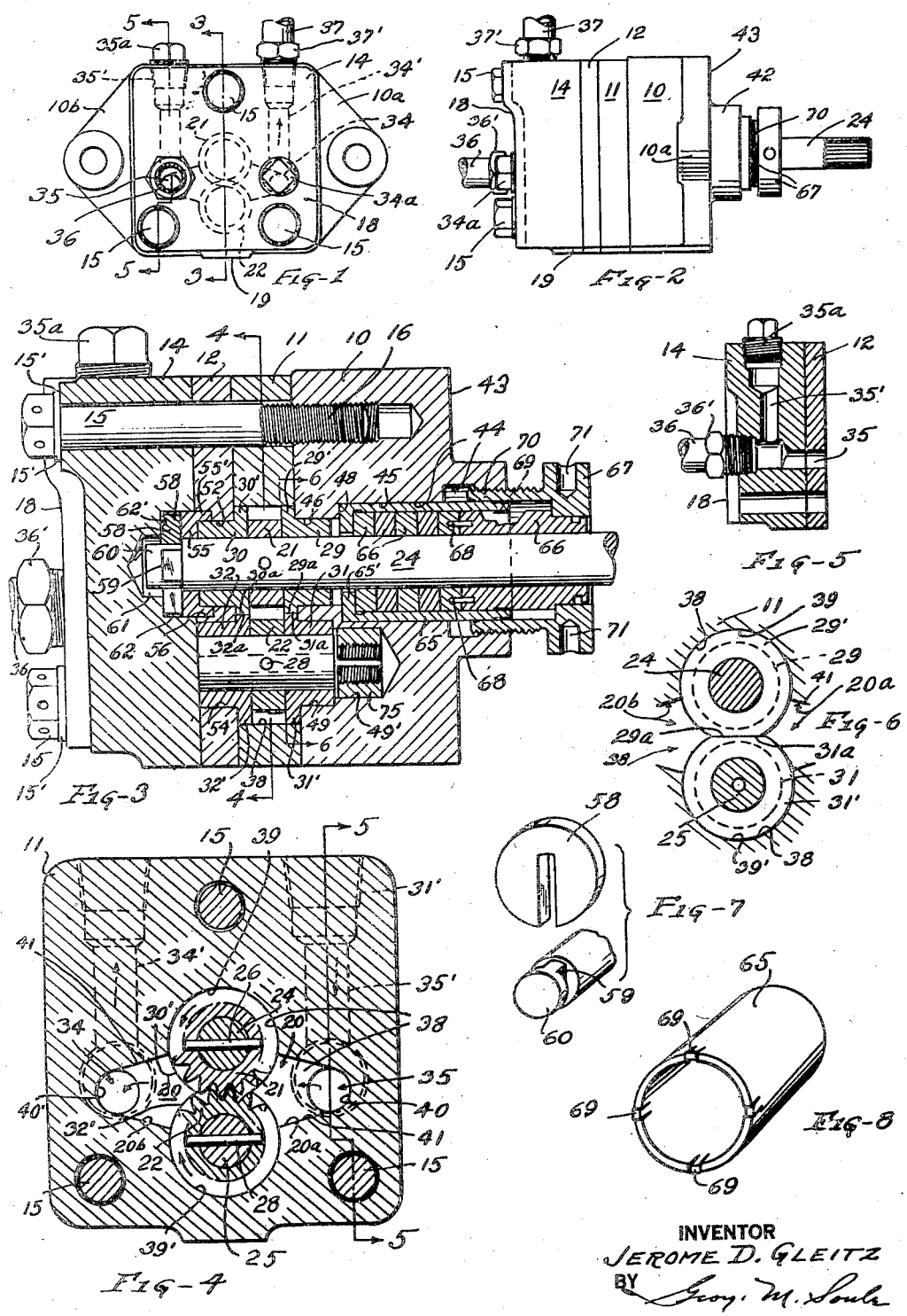
INVENTOR
JEROME D. GLEITZ
BY
Geo. M. Soule
ATTORNEY Patented Aug. 24, 1948

2,447,853

UNITED STATES PATENT OFFICE 2,447,853

OIL PUMP

Jerome D. Gleitz, Euclid, Ohio, assignor to The Marquette Metal Products Company, Cleveland, Ohio, a corporation of Ohio Application January 19, 1943, Serial No. 472,861

3 Claims. (Cl. 308—15)

This invention relates to rotary pumps of the gear type and more particularly to a reversible gear pump of simplified design yet having improved performance characteristics and usable for many diversified purposes. One use is as a fuel pump for Diesel engines.

Generally, the sections of multiple part housings for gear pumps, having several housing sections which must be in accurate alignment, have been positioned in assembled relation by dowels received in accurately aligned complementary sockets in the housing sections. Although such construction has resulted in satisfactory pumps, the use of dowels not only adds to the cost of manufacture of the individual housing sections, but the accuracy of alignment of the sections is not as great as desired.

One object hereof is to provide a multiple part housing for gear pumps and analogous mechanisms which housing may be assembled without the use of dowels and yet which enables reduced clearance between the relatively moving parts of the mechanism without increasing manufacturing costs to the end that the mechanism may operate with substantially minimum slip and without likelihood of binding.

In accordance with the illustrated embodiment of this invention, the bushings or bearings which support the rotatable shafts of the rotary pump elements also serve accurately to align the housing sections which support the bearings, thereby obviating the necessity for special aligning means. A specific object is to provide a gear pump in which the bearings for the gear-supporting shafts serve to maintain the several housing sections in operative accurate alignment.

Another object is to provide an improved thrust bearing assembly for a shaft rotatable within a housing made up of sections assembled face to face and wherein the thrust bearing assembly serves in place of dowels to retain the sections of the housing in accurate alignment.

A further object is to provide a sectionalized bearing supporting housing for gear pumps, which housing may be assembled together with the bearings without the use of dowels and which does not require gaskets in order to obtain fluid tight joints between substantially flat individual sections of the housing.

Other objects include the provision of: (a) a novel locking means for preventing undesired rotation of adjacent parallel flanged sleeve type bearings for the pump-gear-supporting shafts, (b) an improved fluid tight seal assembly for a rotatable shaft extending from an apertured wall of a housing and including a simplified and efficient locking means for preventing undesirable rotation of a packing sleeve which forms a part of the seal assembly, (c) a novel means for removing a sleeve type bearing from a dead end socket, which means may be rendered operative without the use of special tools, and (d) an improved and simplified thrust bearing assembly to prevent longitudinal movement of a rotatable shaft which terminates within a closed socket.

Other objects and advantages will become apparent from the following description of the embodiment shown in the accompanying drawings, wherein:

Fig. 1 is a plan view of a gear pump incorporating the invention; Fig. 2 is an end view of the gear pump; Fig. 3 is a central sectional view as indicated by the line 3—3 of Fig. 1; Fig. 4 is a transverse sectional view as indicated by the line 4—4 of Fig. 3; Fig. 5 is a sectional view taken as indicated by the line 5—5 of Fig. 1; Fig. 6 is a fragmentary or detail view showing two adjacent shaft-supporting bushings; Fig. 7 is a perspective view showing cooperating parts of the pump drive shaft and retaining means therefor; and Fig. 8 is a perspective view of a packing retaining sleeve for the pump.

Referring to the drawings, a preferred embodiment of the reversible gear pump hereof comprises, as shown, a plurality of rectangular metal body sections 10, 11 and 12 and a similar end section 14 retained in cooperating stacked face-to-face relationship by suitable fastening means such as a plurality of cap screws 15. The screws 15 extend through respective aligned openings in the sections 11, 12 and 14; are screwed into complementary aligned threaded sockets 16 in the body section 10, and have their heads in operatively abutting engagement with a main face 18 of the end section 14, as through the intermediary of lock and/or sealing washers 15'.

Each of the sections 10, 11, 12 and 14 has a projecting portion centrally disposed at one edge defining a suitable supporting surface area 19 to facilitate mounting, and the mutually engaging end faces of the several sections are machined or finished as by lapping to provide joints capable of resisting high fluid pressure without leakage and without gaskets.

The body sections 10, 11 and 12 cooperate to define an internal pumping chamber 20 (more fully explained later), in which chamber a driving pump gear 21 and a cooperating idler pump gear 22 are free to rotate in constant mesh.

The gears 21 and 22 may be keyed to a driving pump gear shaft 24 and a cooperating idler gear shaft 25, respectively, by suitable key pins 26 and 28, passing through the gears and supporting shafts. The shafts 24 and 25 are rotatably supported in pairs of flanged tubular bearings or bushings 29—30, and 31—32, respectively. Each of the bushings 29 and 31 is supported jointly by the body sections 10 and 11 and each of the bushings 30 and 32 is supported by the body sections 11 and 12.

The end section 14 and body section 12 are apertured to provide a pair of branched fluid passages 34 and 35 between the chamber 20 and the exterior of the pump. The passages 34 and 35 are similar, and, as shown in Figs. 2, 4 and 5, said passages extend from respective end portions of the chamber 20 through the sections 12 and 14 and open to the exterior of the pump at the end face 18 of the end section 14. Beyond the center of the end section 14, in a direction away from the chamber 20, the passages 34 and 35 are intersected by branch passages 34' and 35' respectively, which open to the exterior of the pump.

If the gears 21 and 22 are rotating in the direction of the arrows in Fig. 4, the passage 35 becomes an intake passage and fluid is drawn from a suitable supply pipe 36, which may be attached to the pump as by a pipe coupling 36' threaded into an offset threaded enlarged end portion of the passage 35, into a suction side 20a of the chamber 20. The fluid is forced by the action of the gears 21 and 22 from the suction side 20a into a pressure side 20b of the chamber 20 from whence it is discharged into the passages 34 and 34' to a suitable pipe 37, which may be attached to the pump as by a pipe coupling 37'. When the passages 34' and 35 are being used, the passages 34 and 35' are closed by suitable pipe plugs 34a and 35a as shown in Figs. 2 and 5. Other combinations of inlet and outlet passages may be used if desired. Reversing the direction of rotation of the gears 21 and 22 reverses the direction of fluid flow.

The flanges 29', 30', 31' and 32' of the bushings 29, 30, 31 and 32, respectively (Fig. 3), are received within a complementary opening 38 in the section 11. The opening 38 defines the end walls of the chamber 20 and the side walls are defined by the end faces of the sections 10 and 12 which are in engagement with the section 11. One arm of the opening 38 is defined by a pair of spaced circular arc portions 39 and 39' having a common center line normal to a second pair of smaller circular arc portions 40 and 40', which define, with the substantially straight line portions 41, the other arm of the opening 38. Each of the arc portions 39 and 39' is slightly over a semi-circle in extent, and the flanges 29' and 30' of the bushings 29 and 30, respectively, are pressed into the arc portion 39 near opposite end faces of the body section 11 and the flanges 31' and 32' of the bushings 31 and 32, respectively, are likewise pressed into the arc portion 39' near opposite end faces of the body section 11.

As shown clearly in Fig. 6, the bushings 29 and 31 are each prevented from rotating by cooperation of mutually engaging flattened portions 29a and 31a of the outer periphery of the flanges 29 and 31', respectively, and likewise (Fig. 3) each of the bushings 30 and 32 is similarly prevented from rotating by cooperation of the mutually engaging flattened portions 30a and 32a of the flanges 30' and 32', respectively. By means of this interlocking cooperation of the flanges of adjacent parallel bushings, more complicated pin or dowel type bushing locking means are rendered unnecessary, and, as will become apparent hereinafter, the accuracy of the novel aligning action of the bushings is thereby increased.

The body section 10 has suitable mounting lugs 10a and 10b of reduced thickness extending from opposite sides thereof and apertured to receive attaching bolts, not shown. Centrally of the section 10 is an internally threaded tubular extension 42 projecting beyond an outer end face 43 of the section 10. The opening 44 in the tubular extension 42 continues through the body section 10 and has an intermediate portion 45 of reduced diameter and an inner portion 46 of still smaller diameter defining an annular shoulder 48 with the portion 45.

The shank portion of the bushing 29 is pressed into the portion 46 of the opening 44 and the shank portion of the bushing 31 is pressed into a bushing socket 49 in the body section 10 which is spaced from and parallel to the opening 44. The body section 12 has spaced openings 52 and 54 into which are pressed the shank portions of the bushings 30 and 32, respectively. Each of the bushings 29 and 31 is thus supported jointly by the sections 10 and 11 and each of the bushings 30 and 32 is supported jointly by the sections 11 and 12. The peripheries of each of the bushings 29 to 32 are very accurately machined and the complementary openings into which they are received are very accurately located and reamed. This joint supporting action serves to retain the section 10, 11 and 12 in alignment, and since the alignment is due to the bushings 29 to 32 which rotatably support the gear driving shafts 24 and 25, the gears 21 and 22 rotate with a minimum of clearance with respect to the walls of the chamber 20, resulting in maximum pump performance and minimizing the danger of binding. Furthermore, rotation of the bushings 29 to 32 is prevented by the mutual engagement of bushing flanges already described, non-binding operation of the rotary parts is insured throughout the effective life of the pump.

A thrust and shaft retaining bearing assembly for the driving pump gear shaft 24 near the inner end thereof (Fig. 3) comprises a bushing or collar 55 having an annular rim portion 55' pressed into an annular recess 56 defined by a counterbored portion of the opening 52 and the peripherally outward surface of the shank portion of the bushing 30. In sliding engagement with the end face of the collar 55 is a U-shape retainer 58 (Fig. 7) the arms of which fit tightly over diametrically opposite parallel flattened portions 59 in a reduced end portion 60 of the shaft 24. The reduced end portion 60 of the shaft 24 extends freely into a socket 61 in the end section 14 which socket has a counterbored portion 62 which the bushing 55 fits snugly and in which the retainer 58 is free to rotate in sliding engagement with the bushing 55 and a shoulder 62' defined by the counterbored portion 62 of the socket 61.

It will be seen from Fig. 3 that whenever it is necessary, as during servicing of the pump, to remove the bushings 29—32 all of these can be pushed out of place when the housing sections are disassembled, except the bushing 31. To facilitate removal of the bushing 31 from its complementary socket 49, a longitudinally split internally threaded draw collar or sleeve 75 is slidably mounted in a reduced inner dead ended bore portion 49' of the socket 49 and normally held in place by spring friction against the wall of the dead ended bore. The threads of the collar 75 mate with the threads of any one of the housing-section-securing screws 15 so that one of the screws 15 can be passed through the bushing 31 into the collar 75 to draw out said bushing 31.

The driving pump gear shaft 24 extends through the opening 44 of the section 10 beyond the outer end of the tubular extension 42 and may be rotatably driven externally of the pump as, for example, by means of an internally splined or serrated shaft (not shown) of the mechanism which is served by the pump.

A fluidtight seal is formed around the shaft 24 in the opening 44 by means of a seal assembly comprising a tubular seal retainer or sleeve 65, having an internal flange 65' at its inner end. The sleeve is pressed or otherwise secured tightly into the portion 45 of the opening 44 in the tubular extension 42. Suitable packing such as split braided pressed asbestos rings 60 are retained within the sleeve 65 in contact with and surrounding the shaft 24. The outermost packing ring (to the right Fig. 3) is abutted by a gland sleeve 66 (e. g. bronze) constituting an outer bearing for the shaft 24 and which gland sleeve, in turn, is supported within a central bore of a gland retainer nut 67 at one end and within the sleeve 65 at the other end. The gland retainer nut 67 has an externally threaded annular flange 70 threaded into the opening 44 around the outer end of the sleeve 65. Spaced pins 68 on the inner end of the gland and bearing sleeve pierce the outermost section of the packing 66, so that the gland sleeve is prevented from turning relative to the packing.

In order to prevent loosening of the gland nut 67, the outer end of the sleeve 65 has pairs of longitudinally extending slots defining a plurality of peripherally spaced prong portions 69 which are initially bent radially outward as shown in Fig. 8. The inner end of the flange 70 of the retainer nut is chambered so as to slide over the prong portions 69 and press them inwardly as the nut is screwed into the opening 44. The spring force of the prong portions, biased against the gland retainer nut 67, then prevents rotation of the nut. The retainer nut 67 may be turned for adjustment by suitable wrench pins engaging sockets 71 in the head portion of the retainer nut. The sleeve 65 and gland retainer nut 67, being made of the same materials, expand equally and therefore any heating of said parts does not affect the locking action of the spring fingers 69. The spring fingers 69, the force of which operates transverse to the principal direction of expansion, remain in full operating effect in preventing relative turning of the parts as described above regardless of the direction of operation of the pump.

I claim:

1. In a bearing assembly for a rotary type pump shaft, a housing comprising face to face sections in stacked relationship, a bearing receiving bore in one of said sections and having a counterbored portion, a tubular bearing for the shaft arranged to align two of said sections and fitting tightly into said bore and extending into said counterbored portion to define an annular recess with said counterbored portion, and an annular member for aligning the section having said bore with an adjacent section, said annular member having an axially extending annular flange with an external peripheral surface fitting tightly in said recess and an internal surface embracing the tubular bearing, the central opening of said annular member being aligned with the opening in said tubular bearing for receiving said shaft.

2. In a rotary type pump having a drive shaft, a housing comprising a plurality of metal sections in face to face stacked relationship, a bearing receiving opening in one of said sections and having a counterbored portion, a tubular bearing supporting the shaft and fitting tightly into said opening and extending into said counterbored portion to define an annular recess with said counterbored portion, an annular section-aligning member having an axially extending annular flange fitting tightly in said recess and having a central portion axially abutting said tubular bearing, said annular member bridging two of the housing sections in a manner to align those sections, said shaft extending from the bearing member through the annular member, and a collar detachably engaging the shaft and having one face positioned to abut said annular member on the face thereof opposite from the annular flange.

3. A bearing assembly for a rotary pump in accordance with claim 14 characterized in that said collar is a U-shaped member fitting in complementary parallel grooves on respective opposite sides of said shaft.

JEROME D. GLEITZ.

REFERENCES CITED

The following references are of record in the file of this patent:

UNITED STATES PATENTS

| Number | Name | Date |
|---|---|---|
| 648,204 | Harris | Apr. 24, 1900 |
| 1,068,157 | Nelson | July 22, 1913 |
| 1,498,598 | Williams | June 24, 1924 |
| 1,504,650 | Smith | Aug. 12, 1924 |
| 1,621,733 | McCord | Mar. 22, 1927 |
| 1,965,698 | Goecke | July 10, 1934 |
| 1,970,992 | Wiberg | Aug. 21, 1934 |
| 2,096,490 | Hansen | Oct. 19, 1937 |
| 2,109,680 | Neveling | Mar. 1, 1938 |
| 2,316,565 | Collier | Apr. 13, 1943 |
| 2,346,761 | Johnson | Apr. 10, 1944 |

FOREIGN PATENTS

| Number | Country | Date |
|---|---|---|
| 216,496 | Switzerland | Dec. 1, 1941 |